(12) United States Patent  
Mirov

(10) Patent No.: US 8,988,246 B2
(45) Date of Patent: Mar. 24, 2015

(54) SYSTEM AND METHOD FOR PROXIMAL DEVICE CONFIGURATION USING A DIRECTED BEAM

(75) Inventor: Russell Mirov, Los Altos, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/425,924

(22) Filed: Mar. 21, 2012

(65) Prior Publication Data

US 2015/0058608 A1 Feb. 26, 2015

Related U.S. Application Data

(60) Provisional application No. 61/468,920, filed on Mar. 29, 2011.

(51) Int. Cl.
| | |
|---|---|
| *G08B 23/00* | (2006.01) |
| *G08B 13/14* | (2006.01) |
| *G08B 1/08* | (2006.01) |
| *G05B 19/00* | (2006.01) |
| *G08B 13/18* | (2006.01) |
| *G06F 19/00* | (2011.01) |
| *G06Q 10/00* | (2012.01) |
| *G06Q 10/08* | (2012.01) |

(52) U.S. Cl.
CPC .................................. *G06Q 10/087* (2013.01)
USPC ............... 340/693.6; 340/572.1; 340/539.32; 340/5.92; 340/539.23; 340/556; 235/385; 705/28

(58) Field of Classification Search
CPC .......... G06Q 2220/10; G06Q 30/0601; G06Q 30/0621; G06Q 30/0623; G06Q 30/0639; G06Q 30/0643; G06Q 10/08; G06Q 2250/05; G06Q 10/087; G06Q 10/00; G06Q 2220/00; G06Q 20/22; G06Q 20/32; G06Q 20/327; G06Q 20/04; H04W 8/00; H04W 24/00; H04W 8/24; H04M 1/72569; H04M 2207/30; G06K 13/00; G06K 2007/00; G06K 2215/0002; G06K 2215/0005
USPC ......... 340/693, 572.1, 568.1, 539.13, 539.11, 340/539.1, 572.8, 5.92, 5.73, 10.32, 10.42, 340/693.6, 539.32, 539.23, 686.6, 556; 235/435, 380, 385, 381, 375; 700/227, 700/225, 9, 215; 705/416, 418, 28, 22
See application file for complete search history.

(56) References Cited

U.S. PATENT DOCUMENTS

| | | | | |
|---|---|---|---|---|
| 5,664,113 | A * | 9/1997 | Worger et al. | 705/28 |
| 6,195,006 | B1 * | 2/2001 | Bowers et al. | 340/572.1 |
| 2004/0181467 | A1 * | 9/2004 | Raiyani et al. | 705/28 |
| 2005/0234778 | A1 * | 10/2005 | Sperduti et al. | 705/22 |
| 2005/0258961 | A1 * | 11/2005 | Kimball et al. | 340/572.1 |
| 2006/0073788 | A1 * | 4/2006 | Halkka et al. | 455/41.2 |
| 2008/0017709 | A1 * | 1/2008 | Kennedy | 235/385 |
| 2009/0224040 | A1 * | 9/2009 | Kushida et al. | 235/385 |
| 2011/0210847 | A1 * | 9/2011 | Howard et al. | 340/539.32 |
| 2013/0153650 | A1 * | 6/2013 | Clayton et al. | 235/375 |

* cited by examiner

*Primary Examiner* — Mirza Alam
(74) *Attorney, Agent, or Firm* — Dority & Manning, P.A.

(57) ABSTRACT

Systems and methods for configuring proximally configurable devices deployed in a region that includes scanning the region that includes multiple deployed proximally configurable devices with a directed radiation beam and transmitting data, utilizing the directed radiation beam, to one or more of the deployed proximally configurable devices where the data is associated with the location of the directed radiation beam during scanning within the region.

10 Claims, 8 Drawing Sheets

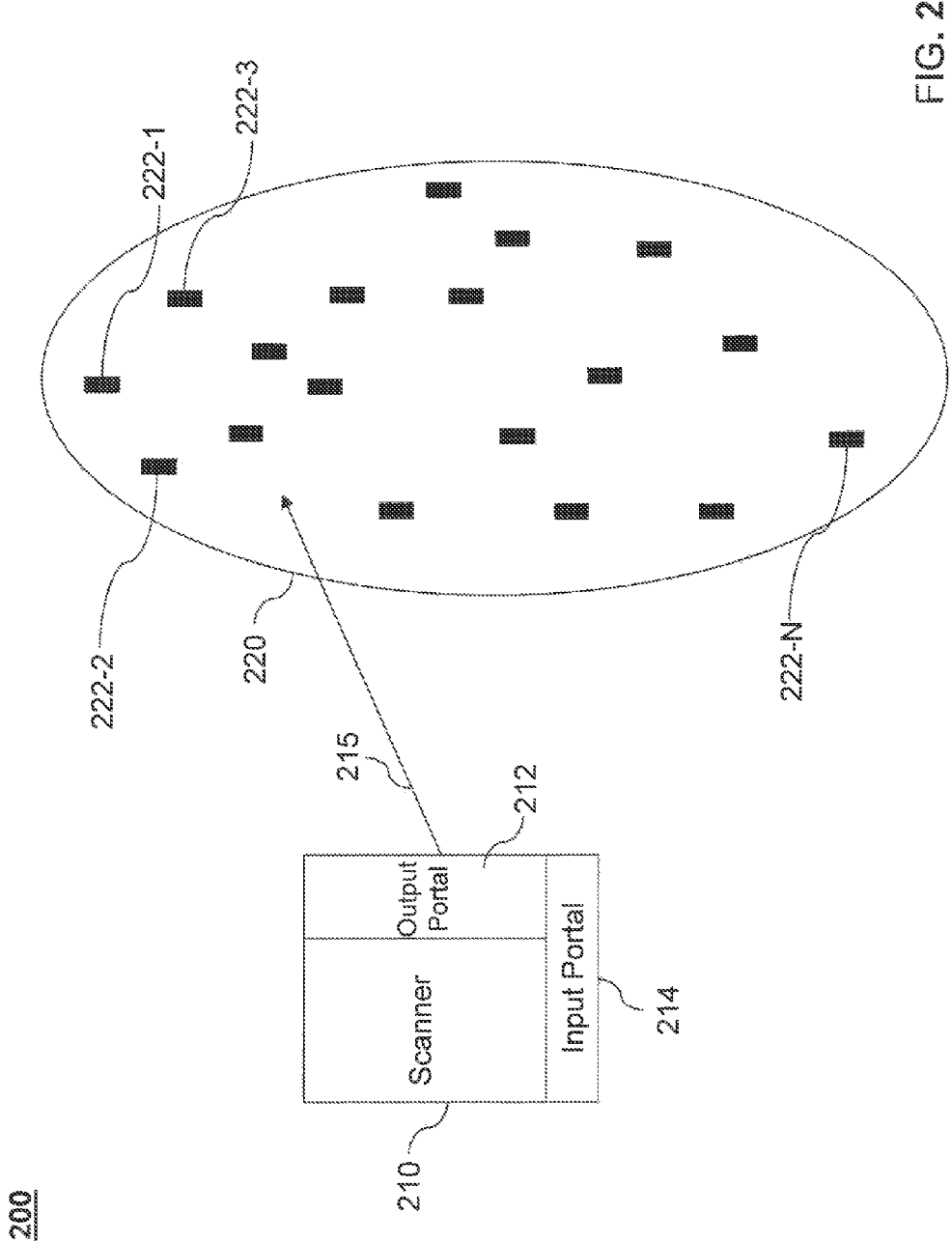

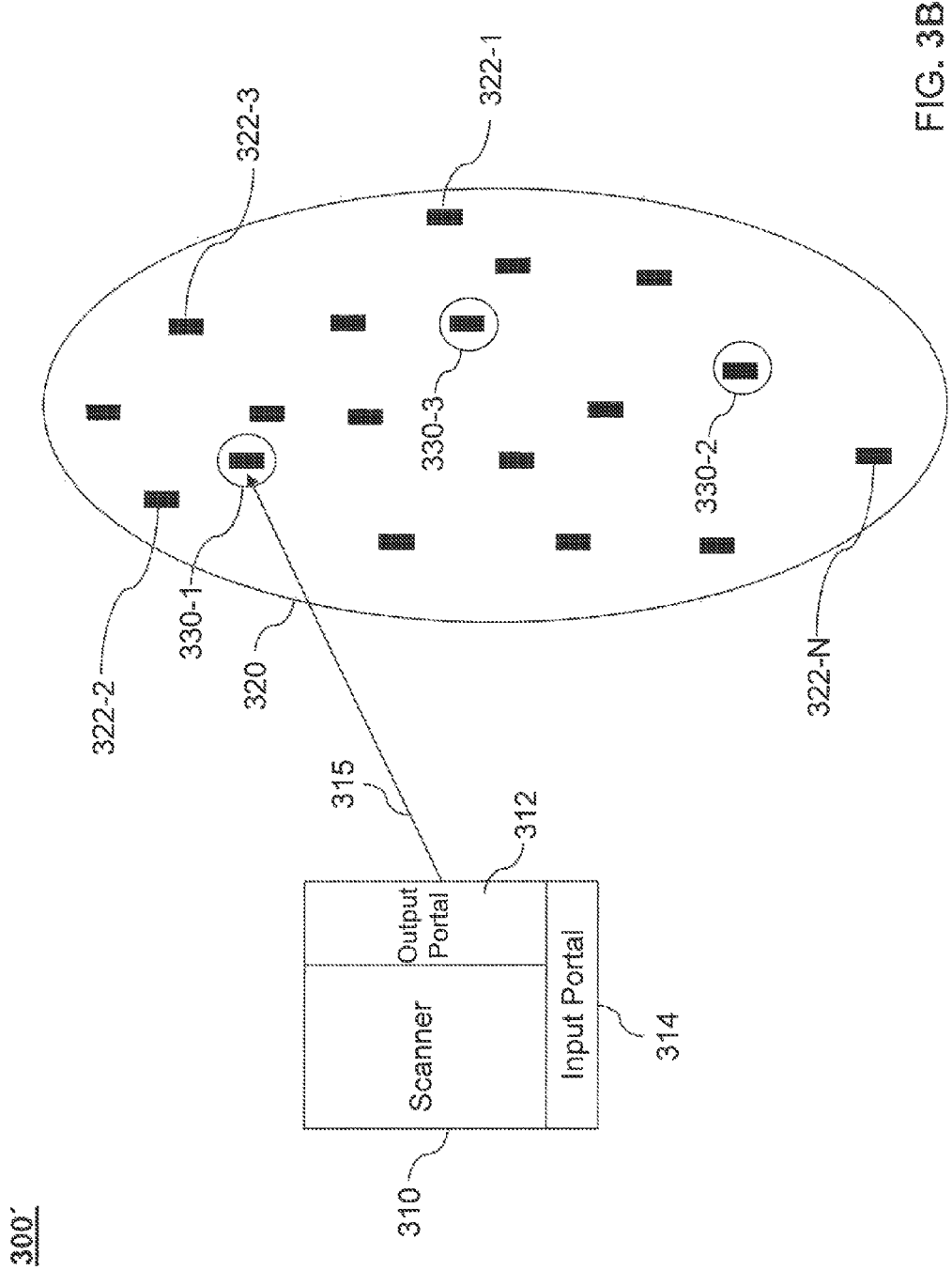

SYSTEM AND METHOD FOR PROXIMAL DEVICE CONFIGURATION USING A DIRECTED BEAM

CROSS REFERENCE TO RELATED APPLICATIONS

This application claims the benefit of U.S. Provisional Application No. 61/468,920 filed Mar. 29, 2011, which is hereby incorporated by reference in its entirety.

BACKGROUND

1. Field

Embodiments relate generally to the field of indoor location based information systems.

2. Background

Typical location based information systems depend on global positioning systems (GPS) to determine a geographic location and a remote database that contains information associated with a particular geographic location. However, GPS receivers generally rely on navigation signals broadcasted by satellites orbiting the Earth. Therefore, such receivers require an unobstructed line of sight to the satellites in order to provide reliable location information. Thus, GPS is typically used to establish locations in outdoor environments only and may not be suitable to indoor locations. However, indoor positioning systems (IPS) have been developed to locate and track objects within indoor environments, such as office buildings. Such systems generally use various wireless transmissions, for example, infrared (IR) or ultrasound signals, for location and tracking purposes.

However, existing solutions for indoor positioning require sophisticated infrastructures be deployed within an interior space of a building. For example, these solutions may require special wiring be installed in the building and/or an architectural analysis of the interior space be performed for purposes of mounting necessary equipment. Further, any devices used in such a solution may have to be configured prior to shipment, or at an early stage of assembly with at least some type of identification such as a pre-configured serial number or identifying token.

BRIEF SUMMARY

Embodiments relate to methods and systems for configuring proximal devices in-situ. By allowing a proximal device to be configured on-site, rather than at the point of manufacture, the proximal devices can be manufactured as identical components. Embodiments provide a capability to configure proximal devices in-situ using a directed beam that also places the proximal devices into a configuration mode.

In an embodiment, a method for proximal device configuration includes scanning a region that includes a number of deployed proximally configurable devices with a directed radiation beam. The method continues with transmitting data utilizing the directed radiation beam to one or more of the deployed proximally configurable devices, where the data is associated with the location of the directed radiation beam during the scanning within the region.

In another embodiment, a method for proximal device configuration includes a deployed proximally configurable device detecting a directed radiation beam and receiving, upon contact with the directed radiation beam, data. The deployed proximally configurable device is one of a number of deployed proximally configurable devices within a region.

In yet another embodiment, a system for proximal device configuration includes a number of deployed proximally configurable devices in a region. The system also includes a scanner that can scan the region with a directed radiation beam. Further, the scanner can send data by way of the directed radiation beam to one or more of the deployed proximally configurable devices upon contact between the directed radiation beam and the deployed proximally configurable device where the data that is sent is associated with the location of the directed radiation beam.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of the present invention and, together with the description, further serve to explain the principles of the invention and to enable a person skilled in the relevant art(s) to make and use the invention.

FIG. 2 is a diagram of an embodiment of an exemplary system for the configuration of proximal devices including a scanner and a plurality of proximal devices.

FIG. 3B is a diagram of an embodiment of an exemplary system illustrating a possible scanning pattern for the configuration of select sub-set of proximal devices consisting of a scanner and a plurality of proximal devices.

Figure 1:
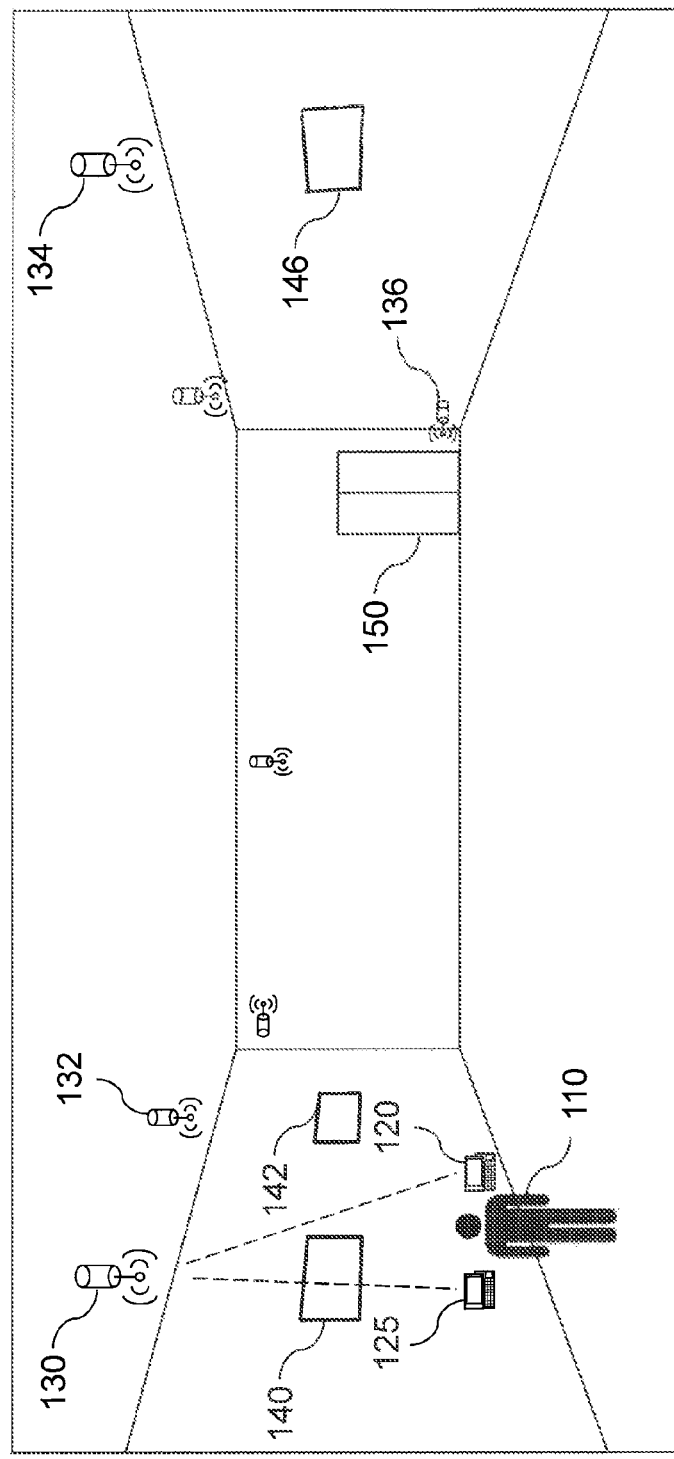
FIG. 1 is a diagram of an embodiment of an example of placement of multiple proximal devices in an interior space.

The features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Embodiments relate to proximal device configuration, which are also referred to herein as beaconing devices. While illustrative embodiments are described herein with reference to particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. System

FIG. 1 is a diagram of an embodiment of an exemplary system 100 of multiple proximal devices and proximate items of interest located in an interior space. In the example shown in FIG. 1, system 100 includes a user 110, a mobile communication device 120, a proximal device scanner 125, and one or more proximally configurable devices 130, 132, 134 and 136. The system may further include objects of interest 140, 142 and 146, and a doorway 150.

Although proximally configurable devices 130, 132, 134 and 136 are labeled, FIG. 1 illustrates additional proximally configurable devices. There is no restriction as to the number or location of such proximally configurable devices. For example, a proximally configurable device can be located on a ceiling, a wall, or in the floor, in any orientation. Although FIG. 1 illustrates an indoor space, proximally configurable devices can be located outdoors as well in an embodiment. In an embodiment, proximally configurable devices 130, 132, 134 and 136 are beacon tags used to transmit information within a limited area. For example, user 110 could be viewing object of interest 140 that is located in proximity to proximally configurable device 130, and may be interested in additional information concerning object of interest 140. In an embodiment, by using mobile communication device 120, the user can receive additional information concerning object of interest 140 that is transmitted from proximally configurable device 130 where such information is stored within memory in proximally configurable device 130. The stored information can include additional information concerning object of interest 140 such as location, detail features, history, in-depth description, sales price, or any other possible associated information.

Proximally configurable devices from which mobile communication device 120 can receive signals may depend on factors such as the location of mobile device 120, and user 110, within the interior space relative to a proximally configurable device. For example, in an embodiment, user 110 could proceed to object of interest 142. In so doing, user 110 would be able to receive information from proximally configurable device 132. The received information could include information regarding object of interest 132, also referred to as a context, using mobile communication device 120. In a similar manner, user 110 could proceed to object of interest 146 and receive context information from proximally configurable device 134 through mobile communication device 120 concerning object of interest 146. In an embodiment, user 110 may receive information about an object of interest from the proximally configurable device most proximate to the object or from another proximally configurable device. In an embodiment, user 110 may receive information from multiple proximally configurable devices.

Context information can include a variety of topics. For example, in a retail store setting a context can include inventory level information regarding specific products, or the context could refer to pricing information, e.g., a sale, as well as the location of a product within a store, e.g., aisle 3, section 2, shelf 1, or even location coordinate information, e.g., latitude, longitude, and/or elevation. Additional contexts can include information such as how an item is used, the nutritional value of a food item, and the like. There is no limitation or restriction associated with context information.

Context information can also refer to information associated with a geographic location. For example, in an embodiment, a proximally configurable device, such as proximally configurable device 136, contains geographic based context information. For example, if user 110 proceeds to exit the room through doorway 150, proximally configurable device 136 transmits context information to mobile communication device 120 regarding logistical information such as the name of the street located on the other side of the doorway, directions to other nearby attractions, or the user's location, or any other information that may be desirable to pass on to user 110 before user 110 leaves the current room. As an example, proximally configurable device 136 is shown mounted on a wall close to a floor. As previously mentioned, there is no restriction as to the location of a proximally configurable device. In addition, there is no restriction as to the type of information stored within each proximally configurable device.

Context information associated with a particular proximally configurable device may also be altered at any time. For example, a particular proximally configurable device may be associated with a store aisle that contains food, where the context is the nutritional value of a certain food item. At some point the store aisle may change how it is being stocked and no longer hold food items, but rather a hard good, e.g., a set of towels. The context information in the proximally configurable device associated with that aisle would simply be updated to contain a new set of context information, now relating to the new item on the shelf, e.g., the set of towels.

The arrangement of the proximally configurable devices, including proximally configurable devices 130, 132, 134 and 136, within the interior space shown in FIG. 1 provides only one example of an arrangement of proximally configurable devices within a space. Any number of arrangements, indoors or outdoors, may be used as necessary.

Mobile communication device 120 communicates with a plurality of proximally configurable devices 130, 132, 134 and 136. Mobile communication device 120 can be any type of mobile computing device having one or more processors, a memory, a user input (for example, QWERTY keyboard, touch-screen, microphone, or a T9 keyboard), and a communications infrastructure capable of receiving and transmitting data over a network. Software may include one or more applications and an operating system. Hardware can include, but is not limited to, a processor, memory, and graphical user interface display. For example, mobile device 102 can include, but is not limited to, a mobile phone, a personal digital assistant (PDA), a laptop computer, a tablet computer, a netbook computer, or other similar type of mobile device capable of processing instructions and receiving and transmitting data.

Mobile communication device 120 is broadly defined to include any type of device that can be mobile with the ability to communicate. For example, mobile communication device 120 can include devices such as a robot, a vehicle, or any other type of mobile device with communication capabilities.

In another embodiment, a non-mobile device (not shown) communicates with a plurality of proximally configurable devices 130, 132, 134 and 136. Such a non-mobile device can include devices such as an asset that is desired to be tracked, or a rarely moved item, e.g., a copying machine.

Although not shown in FIG. 1, mobile communication device 120 is capable of communicating with one or more servers over a network. Such servers can be implemented using any general-purpose computer capable of serving data to mobile communication device 120. The network can be any network or combination of networks used to communicate information between different computing devices. Such network can include, but is not limited to, a wired (e.g., Ethernet) or a wireless (e.g., Wi-Fi and 3G/4G) network. In addition, such a network can include, but is not limited to, a local area network, medium area network, and/or wide area network such as the Internet.

In an embodiment, each proximally configurable device may be manufactured without any specific, unique programming or information, e.g., site specific information that would be transmitted to a user as described above. In such a scenario no special configuration or pre-programming is necessary prior to installation or placement of an individual proximally configurable device.

In an embodiment, each proximally configurable device may be manufactured without any specific site related information, but may include other programming, e.g., unit serial number, date code, model number, etc.

In an embodiment, proximally configurable devices are relatively small, e.g., 1"×¾"×¼", and are expected to continue to decrease in size, approaching approximately 3 mm×3 mm×1 mm and operate using either stored power or ambient light as a power source. In an embodiment, because the proximally configurable devices are so small they lack typical physical connections and thus communicate through signal based contact such as through radio frequency (RF) and/or optical methods. The transmission range of the proximally configurable devices is also limited due to the small size and power capabilities and therefore typically operates in the 1-2 meter range.

In another embodiment, each proximally configurable device derives its power through energy that is delivered to the device during configuration. In such a situation, both power and configuration data are transferred to the device during the configuration process. In another embodiment, each proximally configurable device obtains power through an external source such as ambient light, radiation from a point source or fixture, e.g., a light fixture, or other energy source, e.g., thermal, RF, vibration, electromagnetic, pressure, etc.

In an embodiment, each proximally configurable device operates independently in the sense that configuration and operating of one device is separate and distinct from the configuration and operation of another device. Typically, each proximally configurable device is located such that a user would only be able to receive a transmission from a single proximally configurable device at any point in time as illustrated in FIG. 1 where user 110, at the location shown, can receive a signal from proximally configurable device 130, but not from proximally configurable devices 132, 134 and 136.

Configuration of each of the proximally configurable devices may also be accomplished independently, according to an embodiment. As such, each proximally configurable device can be configured with information unique to a particular proximally configurable device. FIG. 1 illustrates a user 110 with proximal device scanner 125 that can be used for in-situ configuration, according to an embodiment. FIG. 1 shows eight (8) different proximally configurable devices that have been located throughout a room. In an embodiment, all eight (8) devices are essentially identical and contain no information relating to their installed location, at the time of installation. Proximal device scanner 125 is used to connect individually with each proximally configurable device in order to upload information to the device that the device stores and can later transmit a portion, or the entire amount, of information where users, via mobile communication devices, can receive the transmitted information when those users are within the broadcasting range of the proximally configurable device. In an embodiment, proximally device scanner 125 is a fixed position device. In another embodiment, proximally device scanner 125 is a mobile device.

In an embodiment, proximal device scanner 125 can be directed to send a directed beam, to proximally configurable device 130 in order to place proximally configurable device 130 into a programming mode in which information in proximal device scanner 125 can be uploaded and stored in proximally configurable device 130 for later retrieval by another device, such as mobile communication device 110. In a similar manner, proximal device scanner 125 can be directed to send a signal to proximally configurable device 132 in order to place proximally configurable device 132 into a programming mode in which information in proximal device scanner 125 can be uploaded and stored in proximally configurable device 132 for later retrieval by another device, such as mobile communication device 110. This process can be repeated until all the desired proximally configurable devices have been programmed to store the desired information in each device. The stored information can be unique in each proximally configurable device, but there is no such requirement that the information must be unique.

In an embodiment, proximally configurable device 130 monitors the environment for the presence of a beam or signal. In an embodiment, upon detecting such a beam the proximally configurable device can receive instruction information within the directed beam that instructs proximally configurable device 130 to enter a configuration mode. Once in the configuration mode, proximaly configurable device 130 can receive configuration information, where such configuration information can be uploaded through the directed beam. In another embodiment, proximally configurable device 130 monitors the environment for the presence of a beam or signal, but will only enter a configuration mode after receiving the instruction information if the power level, or strength, of the directed beam is above a certain threshold. For example, proximally configurable device 130 can monitor the environment for the presence of light where light, e.g., a flash unit, is used to convey configuration information. However, proximally configurable device 130 is designed to enter a configuration mode only if the light is bright, e.g., over 500 lumens, otherwise proximally configurable device 130 will not enter a configuration mode, even if a proper set of instruction information is received. In an embodiment, instruction information is not required to enter into the configuration mode, but rather the detection of a directed beam with a power level above a threshold is sufficient to instruct proximally configurable device 130 to enter the configuration mode.

FIG. 2 is a diagram of an embodiment of an exemplary system 200 that includes a set of proximally configurable devices 222 in a region 220 and a proximal device scanner 210. As mentioned previously, it should be noted that any number of proximally configurable devices may be used as necessary as indicated by proximally configurable device 222-N where N is an integer greater than 1. In the example shown in FIG. 2, proximal device scanner 210 includes an output portal 212, generating a directed beam 215, and an input portal 214 as well as other components apparent to a person skilled in the art that may include additional components, modules, and/or sub-components as may be necessary.

In an embodiment, proximal device scanner 210 includes one or more input portals, shown in FIG. 2 as a single input portal 214. Each input portal offers a signal based contact device for receiving communications from another device, such as one of the proximally configurable devices 222. Each input portal can be configured to receive one or more types of signal including communications utilizing one or more mediums including, but not limited to optical, RF, electromagnetic, acoustic, pressure, and/or temperature. Furthermore, each input portal may receive communications using multiple types of medium.

In an embodiment, proximal device scanner 210 includes one or more output portals, shown in FIG. 2 as a single output portal 212. Each output portal offers a signal based contact device for sending communications to another device, such as one of the proximally configurable devices 222. Each output portal can be configured to transmit one or more types of signal, such as directed beam 215, including communications utilizing one or more mediums including, but not limited to optical, RF, electromagnetic, acoustic, and pressure. Furthermore, each output portal may transmit communications using multiple types of medium.

Input and output portals do not have to communicate using the same medium, according to an embodiment. For example, proximal device scanner 210 can receive communications using input portal 214 where such communications are optically based, such as a laser, but transmit communications using output portal 212 where the outgoing communications are RF based.

Proximal device scanner 210 transfers information from output portal 212 to a proximally configurable device, e.g., proximally configurable devices 222 in region 220, utilizing directed beam 215. This may be accomplished by proximal device scanner 21G transmitting a configuration enabling sequence to a proximally configurable device whereby the device recognizes the data as configuration data.

Such configuration data can include for example, whether the proximally configurable device should operate in a passive or active mode, according to an embodiment. In an embodiment, a passive mode is where the proximally configurable device is configured to transmit a communication from its output portal without a specific request, e.g., from detector or other device, but rather bases the decision to transmit information based on another factor, such as time, e.g., every 1 minute or on a continuous basis, which may occur at predetermined, regular or irregular intervals. In another embodiment, a passive mode is configured to be where the proximally configurable device senses a user, e.g., sensing a temperature, pressure or electromagnet radiation, and based on that detection transmits a communication from its output portal. In an embodiment, an active mode can be configured such that a proximally configured device transmits information from its output portal only upon the receipt of some type of communication by its input portal. Proximal device scanner 210 can also configure a proximally configurable device to operate in a hybrid active/passive mode responding to specific requests for information while also sending information based on a detection or time base as described above.

Proximal device configuration tool, in an embodiment, has the ability to charge a proximally configurable device, e.g., an internal battery, during configuration. In an embodiment, this transfer of power during configuration is the only source of power for a proximally configurable device. For example, proximal device scanner 210 communicates with proximally configurable device 222 by producing directed beam 215 comprising a laser beam from output portal 212. In another embodiment, proximal device scanner 210 communicates with proximally configurable device 222 by producing directed beam 215 comprising a pulsating light emitting diode (LED) beam from output portal 212. The laser, or LED, are examples of using light as a signal based contact medium, that not only carries the information to be transferred to proximally configurable device 222, but the light itself can be a source of energy. Proximally configurable device 222 receives the light and retrieves the imposed information and also uses the light as a source of energy to charge its batteries (not shown).

Figure 3A:
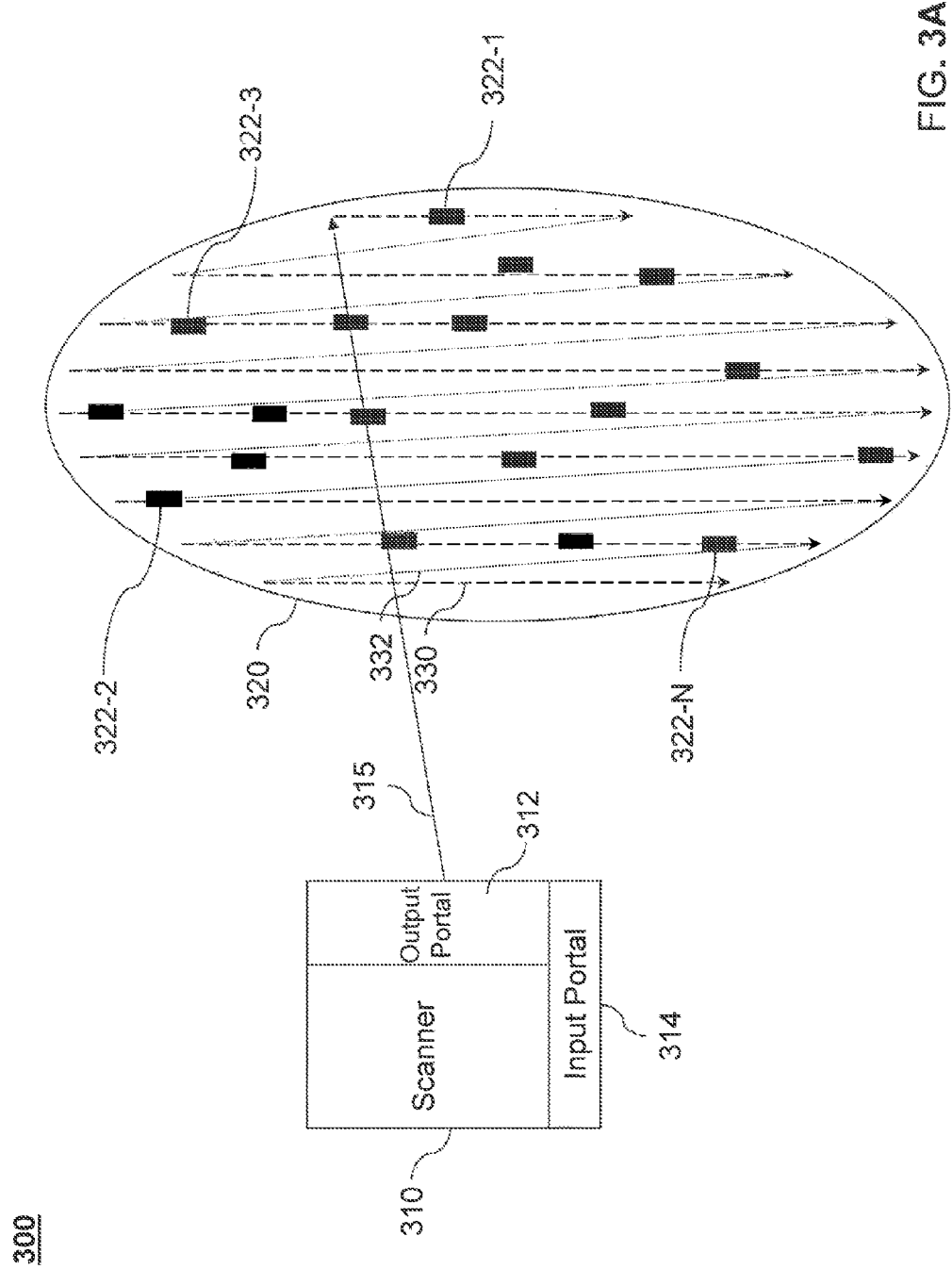
FIG. 3A is a diagram of an embodiment of an exemplary system illustrating a possible raster scanning pattern for the configuration of proximal devices including a scanner and a plurality of proximal devices.

FIG. 3A is a diagram of an embodiment of an exemplary system 300 that includes a set of proximally configurable devices 322 in a region 320 and a proximal device scanner 310 performing a scan using a possible raster pattern. Proximal device scanner 310 includes input portal 314 to receive information, and output portal 312 configured to generate directed beam 315. In this figure, for example, proximal device scanner 310 starts the process of configuring each proximally configurable device 322 starting at proximally configurable device 322-1 and scanning in a raster type pattern within region 320 in a effort to configure each and every proximally configurable device 222, and concluding with proximally configurable device 322-N.

In this example, the dashed lines, e.g., scan line 330, indicates the path of the scan followed by directed beam 312, with the solid lines representing a return scan path, e.g., 332. However, as known to one of ordinary skill in the art, the scan pattern shown in FIG. 3A is merely representative of a raster scan pattern whereby any number of obvious variations are possible. Such variations include a multi-directional scan, e.g., there is no return path, but rather a scan in the opposite direction. Patterns of scanning could depend on a software or computer driven algorithm that determines a sequence of programming within a given region. Furthermore, not all proximally configurable devices 322 need to be scanned and/or configured in a scan. Proximal device scanner 310 may scan a particular proximally configurable device 322 and choose not to enable transferring information and/or configuring the particular proximally configurable device. Alternatively, proximal device scanner 310 may simply by-pass a particular proximally configurable device, thereby not transferring any information and/or power utilizing directed beam 315.

FIG. 3A represents an approach to scan and configure numerous proximally configurable devices within a region in a systematic pattern. Each proximally configurable device 222, within the example scan shown in FIG. 3A, can be configured with different information sent over directed beam 312. This is accomplished as proximal device scanner 310 controls the direction of directed beam 315 and therefore conveys information through directed beam 315 based on the position of directed beam 315 within region 320.

FIG. 3B is a diagram of an embodiment of an exemplary system 300' that includes a set of proximally configurable devices 322 in a region 320 and a proximal device scanner 310 performing a scan using a possible select area pattern. In this embodiment, proximal device scanner 310 determines select areas within region 320 that are to be scanned. In the example shown in FIG. 3B, areas 330-1, 330-2, and 330-3 have been identified as scan areas. In this example, each of the areas to be scanned includes a single proximally configurable device. However, such a limitation, in terms of the size of a selected area, or the quantity of proximally configurable devices 322 within a scan area is not meant to limit the embodiment, but rather is presented as a possible example.

FIG. 3B represents the concept of selecting certain areas within a region that are to be scanned. As proximal device scanner 310 controls the position of directed beam 315, proximal device scanner 310 also can control the information conveyed to each proximally configurable device 322 as previously discussed. FIG. 3B, in an embodiment, also represents the configuring of proximally configurable devices 322 in a random pattern where proximal device scanner 310 selects various random locations to target directed beam 315.

Figure 3C:
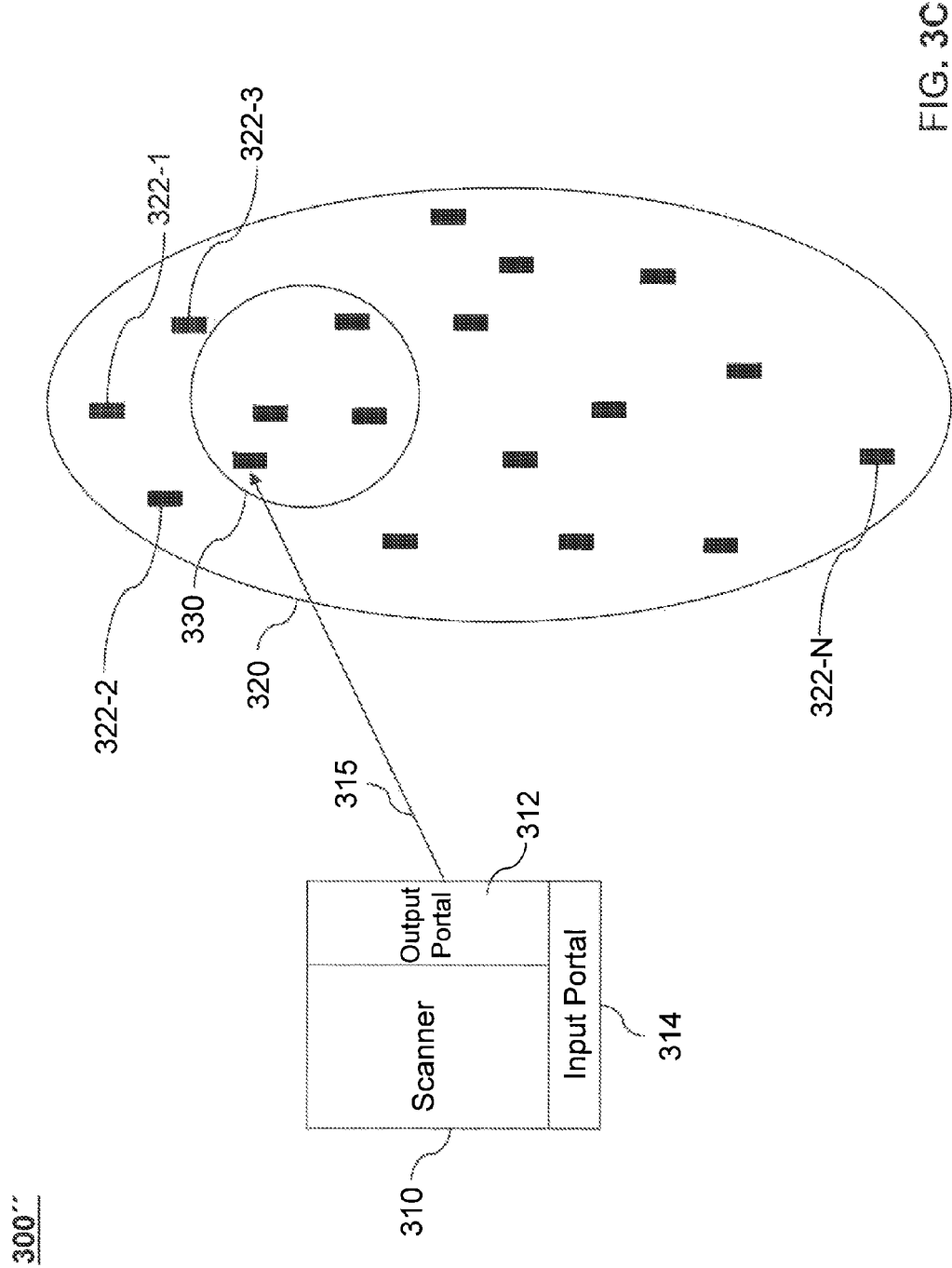
FIG. 3C is a diagram of an embodiment of an exemplary system illustrating a possible scanning pattern for the configuration of select sub-set of grouped proximal devices consisting of a scanner and a plurality of proximal devices.

FIG. 3C is a diagram of an embodiment of an exemplary system 300" that includes a set of proximally configurable devices 322 in a region 320 and a proximal device scanner 310 performing a scan using a possible sparsely directed area pattern. In this embodiment, proximal device scanner 310 determines one or more select areas within region 320 that are to be scanned. In the example shown in FIG. 3B, areas 330 has been identified as a scan area. In this example, the area to be scanned includes multiple proximally configurable devices. In this example, only the proximally configurable devices within area 330 will be scanned and possibly configured by proximal device scanner 310.

II. Method

Figure 4:
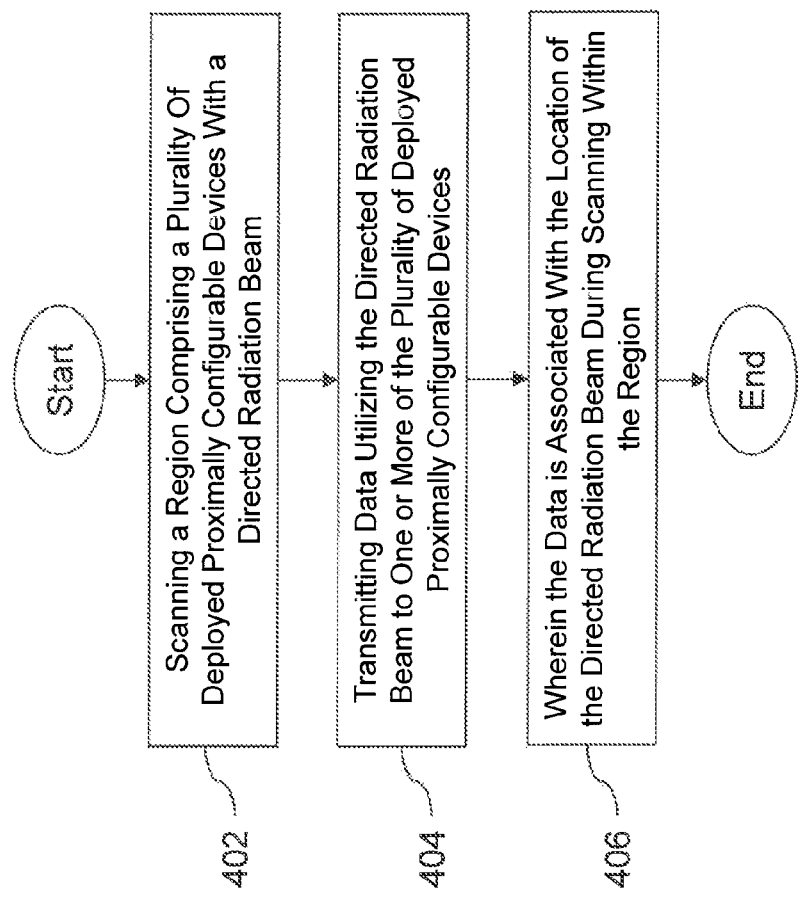
FIG. 4 is a process flowchart of an exemplary method including scanning a region of proximally configurable devices with a directed radiation beam and transmitting data utilizing the directed radiation beam, according to an embodiment.

FIG. 4 is a process flowchart of an exemplary method 400 for configuring a plurality of proximally configurable devices, according to an embodiment. Method 400 includes steps 402, 404, and 406. For ease of explanation, system 200 of FIG. 2, as described above, will be used to describe method 400, but is not intended to be limited thereto.

Method 400 begins in step 402, where the process of scanning a region comprising a plurality of deployed proximally configurable devices with a directed radiation beam is started.

FIG. 2 illustrates the placement of a plurality of proximally configurable devices within a region. The number and placement of proximally configurable devices in FIG. 2 is exemplary only. Exact placement of each proximally configurable device may be dependent upon the application in which the devices are intended to be used. FIG. 2 illustrates the example of placing multiple configurable devices, e.g., 222-1 through 222-N, in region 220 where each proximally configurable device can be configured to store information relating a respective objects of interest, or with a location associated with each proximally configurable device.

Method 400 then proceeds to step 404, which includes transmitting data utilizing the directed radiation beam to one or more of the plurality of deployed proximally configurable devices. For example, in an embodiment each of the deployed proximally configurable devices has not yet been configured and as such each device is essentially identical to the others. Once a proximally configurable device is placed at a desired location, then that device can be configured with information applicable to the deployed location where such information is conveyed using the directed beam. A proximal device scanner is then used to transmit data to one or more of the deployed proximally configurable devices. The information, or data, can be conveyed using the directed beam from the proximal device scanner where the beam is modulated to transmit such information. The data, or a portion of the data, can be used to configure each unit where the information conveyed to each unit may be unique, but is not required to be unique. Configuration using the directed beam can include any method of transmission that is not a physical connection, especially given that the proximally configurable devices can be too small to readily be configured with physical contacts. The structure and handling of such non-contact methods would be apparent to a person skilled in the relevant art given this description.

Method 400 then proceeds to step 406, where the transmitted data is associated with the location of the directed radiation beam during the scanning with the region. For example, the data that is transmitted to a specific proximally configured device depends upon the location of each device. The proximally device scanner controls the orientation and position of the directed beam. Therefore, for any particular orientation and position of the directed beam, a corresponding set of data for that location can be transmitted to a particular proximally configured device. FIGS. 3A, 3B and 3C illustrate a number of methodologies on the sequencing of the access for one or more proximally configurable devices within a region. Method 400 then concludes.

Figure 5:
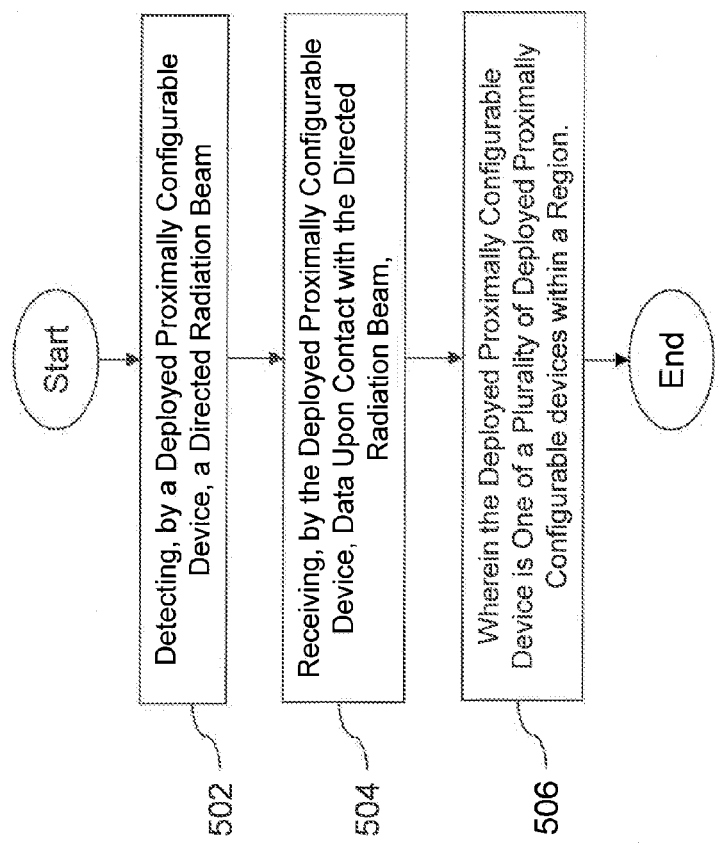
FIG. 5 is a process flowchart of an exemplary method including detecting a directed radiation beam using a deployed proximally configurable device and receiving data upon contact with the directed radiation beam, according to an embodiment.

FIG. 5 is a process flowchart of an exemplary method 500 for configuring a plurality of proximally configurable devices, according to an embodiment. Method 500 includes steps 502, 504, and 506. For ease of explanation, system 200 of FIG. 2, as described above, will be used to describe method 500, but is not intended to be limited thereto.

Method 500 begins in step 502, where the method starts be detecting, by a deployed proximally configurable device, a directed radiation beam. FIG. 2 illustrates a proximal device scanner that generates a directed radiation beam where the proximal device scanner directs the beam to one or more proximally configurable devices that have already been deployed within a region. In step 502 a proximally configurable device detects the presence of a radiation beam, e.g., the directed radiation beam from the proximal device scanner.

Method 500 then proceeds to step 504, where the deployed proximally configurable device receives data upon contact with the directed radiation beam. For example, when the directed radiation beam is detected, then the deployed proximally configurable device will receive data being transmitted via the directed radiation beam, where such receiving can be accomplished through a process such as the modulation of the directed radiation beam. In addition, the deployed proximally configurable device may require that the strength of the directed radiation beam is above a threshold amount before it receives the data. In another embodiment, the deployed proximally configurable device, upon receipt of the transmitted data may determine that a portion of the received data is used to configure the proximally configurable device. In yet another embodiment, the deployed proximally configured device may store the received data within memory in the deployed proximally configured device.

Method 500 then proceeds to step 506, where the deployed proximally configurable device is one of a plurality of deployed proximally configurable devices within a region. As shown in FIG. 2, the deployed configurable device that has detected and received data is one of a plurality of proximally configurable devices within a region. As previously discussed, not all of the deployed proximally configurable devices need to detect or receive data. In addition, the data received by the proximally configurable device may, but does not have to be, unique to that proximally configurable device. Method 500 then concludes.

III. Example Computer System Implementation

Aspects of the present invention shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
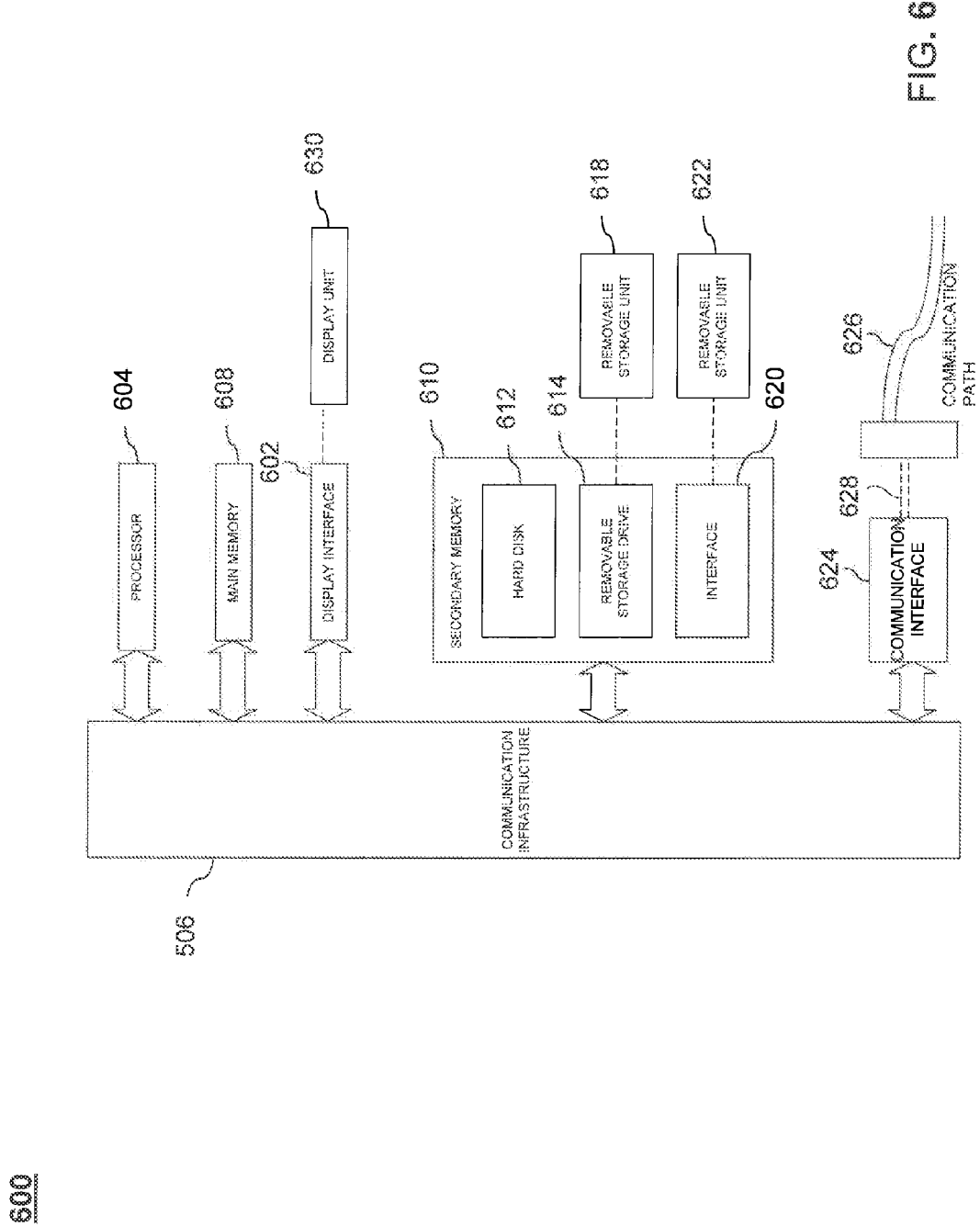
FIG. 6 is a diagram of an example computer system in which embodiments can be implemented.

FIG. 6 illustrates an example computer system 600 in which embodiments, or portions thereof, may by implemented as computer-readable code. For example, portions of system 100, e.g., mobile communication device 120, portions of proximal device scanner 125, and portions of proximally configurable devices 130, 132, 134 and 136, may be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may include a floppy disk drive, a magnetic tape drive, an optical disk drive, a flash memory, or the like. The removable storage drive 614 reads from and/or writes to a removable storage unit 618 in a well known manner. Removable storage unit 618 may include a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communication interface 624. Communication interface 624 allows software and data to be transferred between computer system 600 and external devices. Communication interface 624 may include a modem, a network interface (such as an Ethernet card), a communication port, a PCMCIA slot and card, or the like. Software and data transferred via communication interface 624 may be in the form of signals, which may be electronic, electromagnetic, optical, or other signals capable of being received by communication interface 624. These signals may be provided to communication interface 624 via a communication path 626. Communication path 626 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communication interface 624. Such computer programs, when executed, enable computer system 600 to implement the present invention as discussed herein. In particular, the computer programs, when executed, enable processor device 604 to implement the processes of the present invention, such as the stages in the method illustrated by flowchart 300 of FIG. 3 discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communication interface 624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

IV. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for proximal device configuration, comprising:
    scanning, with a scanning device, a region comprising a plurality of deployed proximally configurable beacon tags with a directed radiation beam;
    instructing one or more of the plurality of deployed proximally configurable beacon tags to enter a configuration mode utilizing the directed radiation beam; and
    transmitting data utilizing the directed radiation beam to one or more of the plurality of deployed proximally configurable beacon tags, wherein the data is associated with a location of the directed radiation beam during scanning within the region such that for any particular position of the directed radiation beam, a corresponding set of data for that position is transmitted to one or more of the plurality of deployed proximally configurable beacon tags, corresponding set of data being received at an input portal of the scanning device;
    wherein the one or more of the plurality of deployed proximally configurable beacon tags receive configuration information from the directed radiation beam when in the configuration mode;
    wherein the data associated with a location of the directed radiation beam comprises a position and an orientation of the directed radiation beam.

2. The method of claim 1, wherein the data is conveyed based on a modulation of the directed radiation beam.

3. The method of claim 1, wherein the data transmitted to each of the one or more of the plurality of deployed proximally configurable beacon tags is unique.

4. The method of claim 1, wherein the scanning of the region does not include scanning all of the plurality of proximally configurable beacon tags.

5. The method of claim 1, wherein an origin of the directed radiation beam is stationary.

6. The method of claim 1, wherein an origin of the directed radiation beam is mobile.

7. A system for proximal device configuration, comprising:
    a plurality of deployed proximally configurable beacon tags in a region; and
    a scanner configured to scan the region with a directed radiation beam that instructs one or more of the plurality of deployed proximally configurable beacon tags to enter a configuration mode, wherein the one or more of the plurality of deployed proximally configurable beacon tags receive configuration information from the directed radiation beam when in the configuration mode;
    wherein the scanner is further configured to send data utilizing the directed radiation beam to one or more of the plurality of deployed proximally configurable beacon tags upon contact between the directed radiation beam and the one or more of the plurality of deployed proximally configurable beacon tags, and
    wherein the sent data is associated with a location of the directed radiation beam such that for any particular position of the directed radiation beam, a corresponding set of data for that position is transmitted to the deployed proximally configurable beacon tag, the sent data being received at an input portal of the scanner;
    wherein the plurality of deployed proximally configurable beacon tags are further configured to receive the data sent by the scanner utilizing the directed radiation beam.

8. The system of claim 7, wherein the scanner is configured to be stationary.

9. The system of claim 7, wherein the scanner is configured to be mobile.

10. The system of claim 7, wherein the proximally configurable beacon tags are configured to transmit information, and wherein the scanner is configured to receive the transmitted information from the proximally configurable beacon tags.

* * * * *